United States Patent
Gardner et al.

(10) Patent No.: US 6,526,908 B2
(45) Date of Patent: Mar. 4, 2003

(54) FLUENT MATERIAL APPLICATOR

(75) Inventors: James J. Gardner, Lancaster, OH (US); Mark A. Brick, Pickerington, OH (US); Allan Hopkins, Columbus, OH (US); Tony Thomas, Worthington, OH (US); Ty Tomlinson, Reynoldsburg, OH (US); Dave Petty, Pickerington, OH (US)

(73) Assignee: J. E. Grote Company, Inc., Blacklick, OH (US)

( * ) Notice: Subject to any disclaimer, the term of this patent is extended or adjusted under 35 U.S.C. 154(b) by 23 days.

(21) Appl. No.: 09/834,320

(22) Filed: Apr. 13, 2001

(65) Prior Publication Data

US 2002/0020348 A1 Feb. 21, 2002

(Under 37 CFR 1.47)

Related U.S. Application Data

(60) Provisional application No. 60/223,158, filed on Aug. 7, 2000.

(51) Int. Cl.$^7$ .............................. A23P 1/08; B05C 11/02
(52) U.S. Cl. .............................. 118/16; 118/20; 118/22; 118/23; 118/52; 118/56; 118/315; 118/313; 118/320
(58) Field of Search .............................. 118/52, 56, 313, 118/314, 315, 308, 310, 13, 16, 22, 23, 320, 321; 99/450, 6; 426/302

(56) References Cited

U.S. PATENT DOCUMENTS

| | | |
|---|---|---|
| 2,872,245 A | 2/1959 | Groth |
| 3,631,818 A | 1/1972 | Zito |
| 3,648,596 A | 3/1972 | Zito |
| 3,982,033 A | 9/1976 | Zito |
| 4,197,794 A | 4/1980 | Raque et al. |
| 5,121,677 A * | 6/1992 | Le Claire et al. ............. 118/18 |
| 5,318,629 A | 6/1994 | Raque et al. |
| 5,445,674 A * | 8/1995 | DeMars ........................ 118/25 |
| 5,855,670 A | 1/1999 | Usgaard et al. |
| 5,865,895 A * | 2/1999 | Huffman et al. .............. 118/16 |
| RE36,178 E | 4/1999 | Freudinger et al. |
| 5,921,170 A * | 7/1999 | Khatchadourian et al. .... 99/349 |
| 5,988,521 A | 11/1999 | Nohynek |

* cited by examiner

*Primary Examiner*—Richard Crispino
*Assistant Examiner*—George R. Koch, III
(74) *Attorney, Agent, or Firm*—Jason H. Foster; Kremblas, Foster, Phillips & Pollick

(57) ABSTRACT

A machine for applying sauce to a pizza crust rapidly and accurately. The crust is placed on a turntable, is centered by stationary platforms having terraced surfaces, and the turntable raises the crust to beneath a plurality of nozzles. The nozzles are mounted to cylinder blocks in which cylindrical cavities are formed. Pistons are slidably mounted in the cavities, and are drivingly linked to a linear prime mover to be displaced upwardly and downwardly to pump sauce into and out of the cavities. Check valves control the flow of sauce from the source of sauce to the crust through the nozzles. The pistons are selectively linked to the linear prime mover for reducing the area onto which the sauce is dispensed, for accommodating smaller and larger pizza crusts.

17 Claims, 15 Drawing Sheets

FLUENT MATERIAL APPLICATOR

(b) CROSS-REFERENCES TO RELATED APPLICATIONS

This application claims the benefit of U.S. Provisional Application No. 60/223,158 filed Aug. 7, 2000.

(c) STATEMENT REGARDING FEDERALLY-SPONSORED RESEARCH AND DEVELOPMENT (Not Applicable)

(d) REFERENCE TO A "MICROFICHE APPENDIX"

(Not Applicable)

(e) BACKGROUND OF THE INVENTION

1. Field of the Invention

This invention relates generally to food-processing machines, and more specifically to an apparatus for coating substrates with fluent materials.

2. Description of the Related Art

In the food processing field, it is desirable to apply consistent quantities of food products, such as meat, cheese and sauces to a substrate rapidly to provide a consistent product to consumers at a high rate of speed. That way, when a product is marked as containing a particular quantity of food, it contains that quantity, not less.

Consistency in food quantity also makes the cost of making each food product more predictable. If measurement of the quantity of food product is inaccurate, the amount of food in a food product marked as containing a particular quantity has to be exceeded to ensure that at least the marked quantity is present. The amount of excess varies due to inaccuracies, and therefore the costs vary.

Consistency in food product presentation is also important. For example, the upper surface of a pizza crust must be coated with pizza sauce prior to the addition of toppings, such as cheese, meat and vegetables. Pizza sauce is a fluent slurry of tomato sauce and other ingredients. Some pizza makers prefer the crust to be coated to within a fraction of an inch from the edge of the crust, while others prefer the crust to be coated essentially to the edge. Regardless of the amount of the crust that is coated, the crust must be coated evenly for a consistent presentation, and this takes time.

The conventional methods of coating pizza crusts include manual and automated methods. The manual methods include pouring a measured amount of sauce onto the crust and spreading. The conventional methods of spreading the sauce include tilting the crust in various directions to cause the sauce to spread by flowing due to gravity. This method takes a lot of experience to get the sauce to flow only where desired. Furthermore, different sauces have different material characteristics, such as viscosity and slurry particle size, which affect flow characteristics.

The second manual method of spreading includes the use of an instrument, such as a spoon or spatula, to push the sauce to the places on the crust that it is desired. However, both the tilting and the pushing methods of spreading sauce result in uneven application of sauce, which results in inconsistent presentation.

It is known to automate the application of fluent materials to substrates. U.S. Pat. Nos. 2,872,245 to Groth, 3,631,818 to Zito, 3,648,596 to Zito, 3,982,033 to Zito, 4,197,794 to Raque et al., 5,318,629 to Raque et al., 5,855,670 to Usgaard et al., 5,988,521 to Nohynek and Re. 36,178 to Freudinger et al. show devices for automating the food product application process.

The '033 and '818 patents to Zito show a pizza crust conveyed along a conveyor beneath a nozzle. Once the crust is detected by a sensor, a central controller signals the conveyor to stop, the nozzle pours sauce onto the crust while rotating. The nozzle has a downwardly extending arm with a head at the bottom into which the sauce flowing down through the arm goes before being spread outwardly by the arm. Some of the other patents cited show mechanisms for dispensing liquids or other food particulate material onto substrates below, and many refer to waterfall cascading of liquid or particulate onto an awaiting surface.

One of the problems with the conventional automated means for applying fluent materials is inaccuracy in placing the fluent material at the place desired on the substrate. For example, the cascading of fluent material normally results in the material being applied in undesirable places, such as the edges of the crust. An additional problem is that product is wasted when the fluent material is cascaded onto areas that are not food substrates, which includes a part of a conveyor at the edges of round pizza crusts where gaps are formed between the crusts.

Additional problems result from automated machines that are too slow or are unable to adapt to fluent materials of characteristics that vary from those the machines were designed to apply. Furthermore, many of the machines are designed for use in a continuous process, whereas some situations call for a batch process.

An example of such a situation is a pizza restaurant. Continuous process automated machines are not conducive to pizza making at pizza restaurants, because in this environment each pizza must be custom-made for each consumer. There are normally various crust thicknesses and sizes, and pizza restaurants must be able to make pizzas of every possible iteration within a short time period. Automated machines do not work well in this environment, and manual methods of applying sauce are not fast enough.

Therefore, the need arises for an apparatus that applies sauce evenly and accurately to exactly the portion of any of the sizes of crusts desired.

(f) BRIEF SUMMARY OF THE INVENTION

The invention is an apparatus for coating an upper surface of a substrate with fluent material, such as pizza sauce on a pizza crust. The apparatus comprises a housing to which the elements of the invention are mounted. A first linear prime mover is connected to the housing and has a drive shaft displaceable along a longitudinal axis. A cylinder block is connected to the housing and has a cavity bounded by a cylindrical sidewall. A piston is drivingly linked to the drive shaft and is slidably mounted within the cavity. The piston has an end surface and an outer cylindrical surface, and the outer cylindrical surface seats against the cylindrical sidewall of the cylinder block forming a seal, thereby forming a chamber defined by the cylindrical sidewall and the piston end surface.

A supply conduit is connected to the cylinder block, and has a fluid passageway in fluid communication with a reservoir of fluent material. An inlet is formed in the cylinder block at the supply conduit for permitting fluid flow between the chamber and the passageway of the supply conduit. A nozzle is connected to the cylinder block and has a fluid passageway through it. An outlet is formed in the cylinder block near the nozzle for permitting fluid flow between the chamber and the nozzle's fluid passageway. A turntable is rotatably mounted to the housing beneath the nozzle. The turntable is drivingly linked to a rotary motor for rotating the substrate beneath the nozzle to receive fluent material on the upper surface of said substrate.

In a preferred embodiment, there is a drive member rigidly mounted to the drive shaft, and there is a plurality of pistons, at least some of which are drivingly linked to the drive member. Each of the pistons has an end surface and an outer cylindrical surface. A plurality of cylinder block cavities are also contemplated, each of which is bounded by a cylindrical sidewall, and each of the pistons is slidably mounted in a corresponding one of the cavities with each outer cylindrical piston surface sealingly seating against the corresponding cavity's cylindrical sidewall. This combination thereby forms a plurality of sealed chambers, each chamber being defined by one of the cylindrical sidewalls and one of the piston's end surfaces.

There are also, in this preferred embodiment, a plurality of cylinder block connected nozzles, each nozzle having a fluid passageway through the nozzle, and each nozzle corresponding to one of the cavities. A plurality of cylinder block outlets are formed, wherein one outlet is between each one of the cavities and that cavity's corresponding nozzle for permitting fluid flow between each of the chambers and each of the nozzles' fluid passageways.

In a still more preferred embodiment, a structure is provided for selectively linking the pistons to the drive member. Preferably, a solenoid is connected to the drive member, and the solenoid has a linearly displaceable solenoid drive shaft. A locking tab is connected to the solenoid drive shaft and is slidably mounted to the drive member near at least one of the pistons. The locking tab is releasably inserted by linear displacement of the solenoid drive shaft into a recess formed in one of the pistons. The solenoid and locking tab structure thereby drivingly link the piston to the drive member.

(g) BRIEF DESCRIPTION OF THE SEVERAL VIEWS OF THE DRAWINGS

Figure 1:
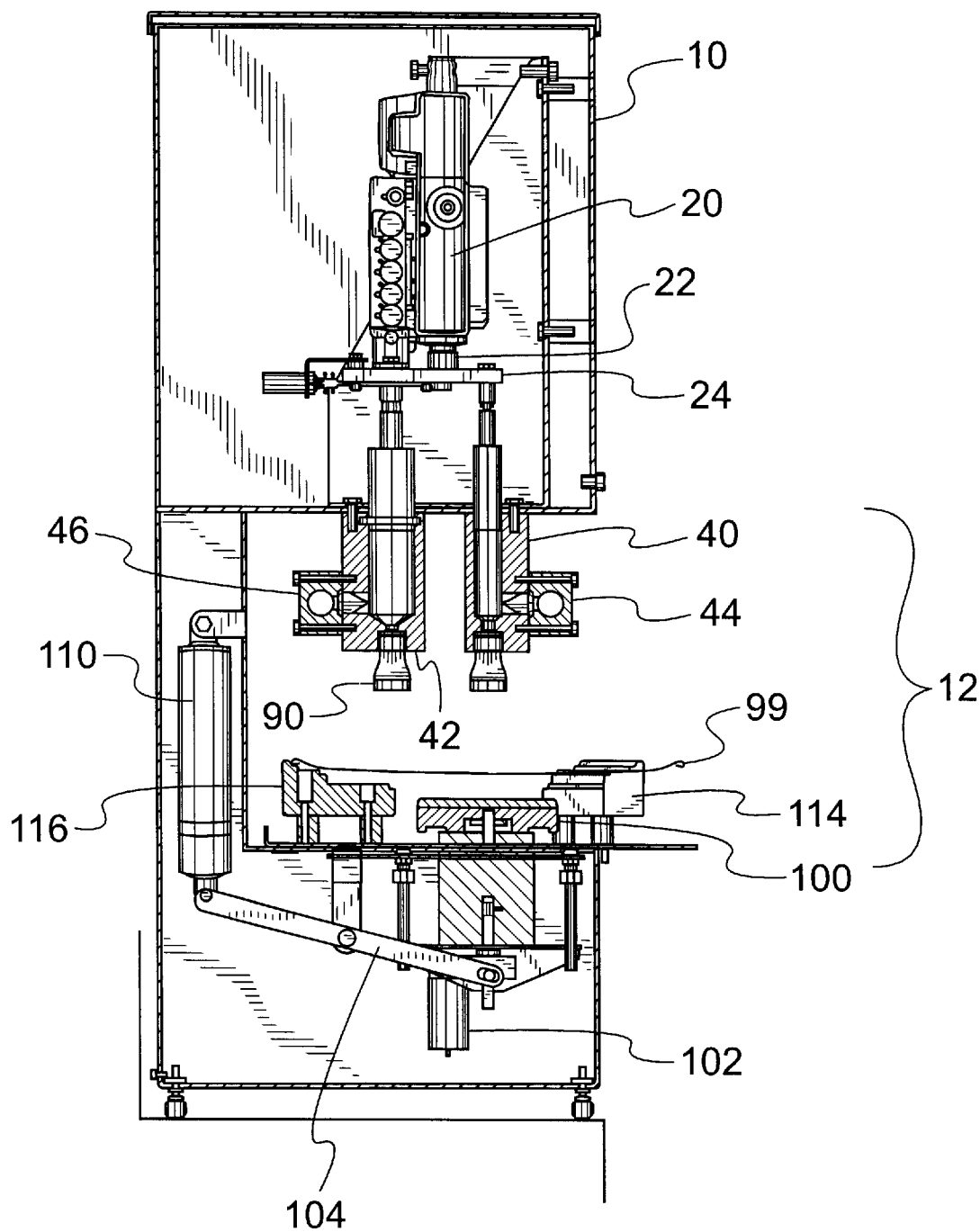
FIG. 1 is a side view in section illustrating the preferred embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

(h) DETAILED DESCRIPTION OF THE INVENTION

The preferred embodiment of the present invention includes a preferably stainless steel housing 10 enclosing some of the moving parts of the invention, and serves as a framework to which the elements of the invention are mounted. The housing 10 also forms an open workspace 12 in which a circular pizza crust (preferably on a flat, circular pan for rigidity) is positioned. After insertion of the pizza crust in the workspace 12, the invention is actuated to form a consistent diameter and thickness sauce layer on the upper surface of the crust. Of course, the invention could alternatively be used to apply any fluent material evenly and accurately to any substrate. The manner in which the sauce layer is formed on the circular pizza crust is described in detail below, and the description below is sufficient for a person having ordinary skill in the art to understand how the present invention could be used with fluent materials and substrates other than those described.

In the preferred embodiment, a prime mover 20 is mounted to the housing above the workspace 12. The prime mover 20 has a drive shaft 22 that, during operation, is displaced longitudinally along a vertical path. Drivingly linked to the drive shaft 22 is a drive member, preferably the rigid, flat drive plate 24. The drive plate 24 is driven by the drive shaft 22 when the latter is driven by the prime mover 20.

Figure 2:
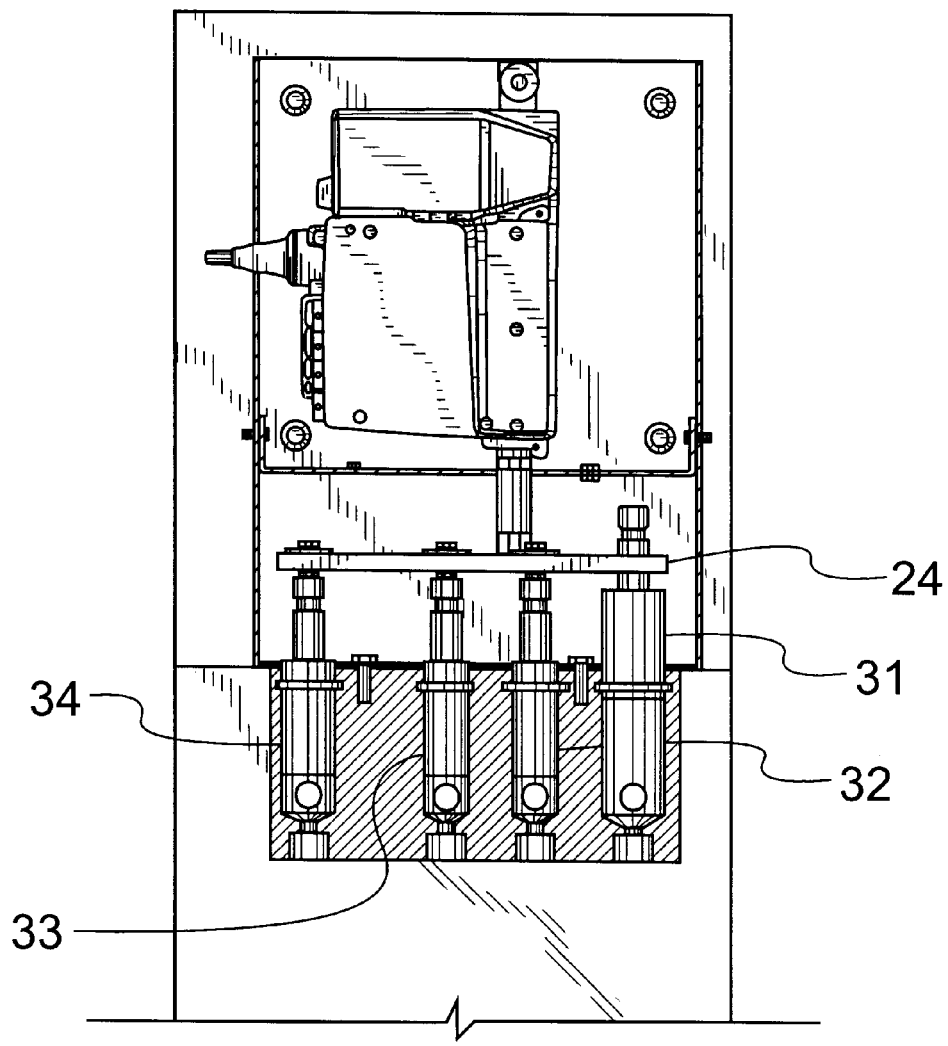
FIG. 2 is a front view in section illustrating the preferred prime mover and pistons in the cavities.

The drive plate 24, as better viewed in FIG. 2, can be drivingly linked to a plurality of pistons; in the preferred embodiment there are eight pistons 31, 32, 33, 34, 35, 36, 37 and 38. Each of the pistons 31–38 has a circular cylindrical sidewall and a lower end surface. The pistons are linked to the drive plate 24 through piston rods mounted coaxially thereto and extending upwardly from the pistons and through the drive plate 24. The four pistons 31–34 shown in FIG. 2 have piston rods that are releasably drivingly linked to the drive plate 24, and the four pistons 35–38 directly behind have piston rods that are drivingly linked to the drive plate 24 at all times that the invention is operable. Of course, a greater or fewer number of pistons than eight could be used, more or fewer of those pistons could have releasable links to the drive plate 24, and all pistons could be linked directly to the drive shaft 22, as will become apparent to a person of ordinary skill in the art. As will become apparent, the drive plate is used to load the drive shaft evenly with the opposing forces exerted by the multiple pistons arranged on the drive plate 24 around the drive shaft's axis, thereby limiting the amount of lateral load on the prime mover 20.

Each piston is slidably mounted in one of eight corresponding cavities 51–58 formed in the first and second cylinder blocks 40 and 42, respectively, which are rigidly mounted to the housing 10. Each of the cavities 51–58 has a circular cylindrical sidewall aligned coaxially with, and in slidable abutment against, the outer cylindrical sidewall of one of the pistons, thereby permitting longitudinal displacement of the pistons in the cavities. The lower end of each of the cavities is sealed by the floors of the blocks 40 and 42 except for an outlet formed therein (as described below). The upper end of each cavity forms a circular opening into which the corresponding piston slidably extends.

A conventional flexible O-ring is mounted in a circumferential groove formed in each of the inwardly facing cylindrical sidewalls of the cavities 51–58. A rod seal is thereby formed between the outer, cylindrical surface of each piston and the inner surface of the associated O-ring to seal any gap formed between the piston sidewall and the cavity sidewall. The resulting structure forms a compression/expansion chamber in that portion of every cavity beneath the piston into which pizza sauce is drawn and out of which pizza sauce is expelled by displacing the piston. Each chamber, therefore, is bounded on the top by the lower face of each piston, on the sides by the cavity sidewall, and on the bottom by the floor of the cylinder block.

Figure 3:
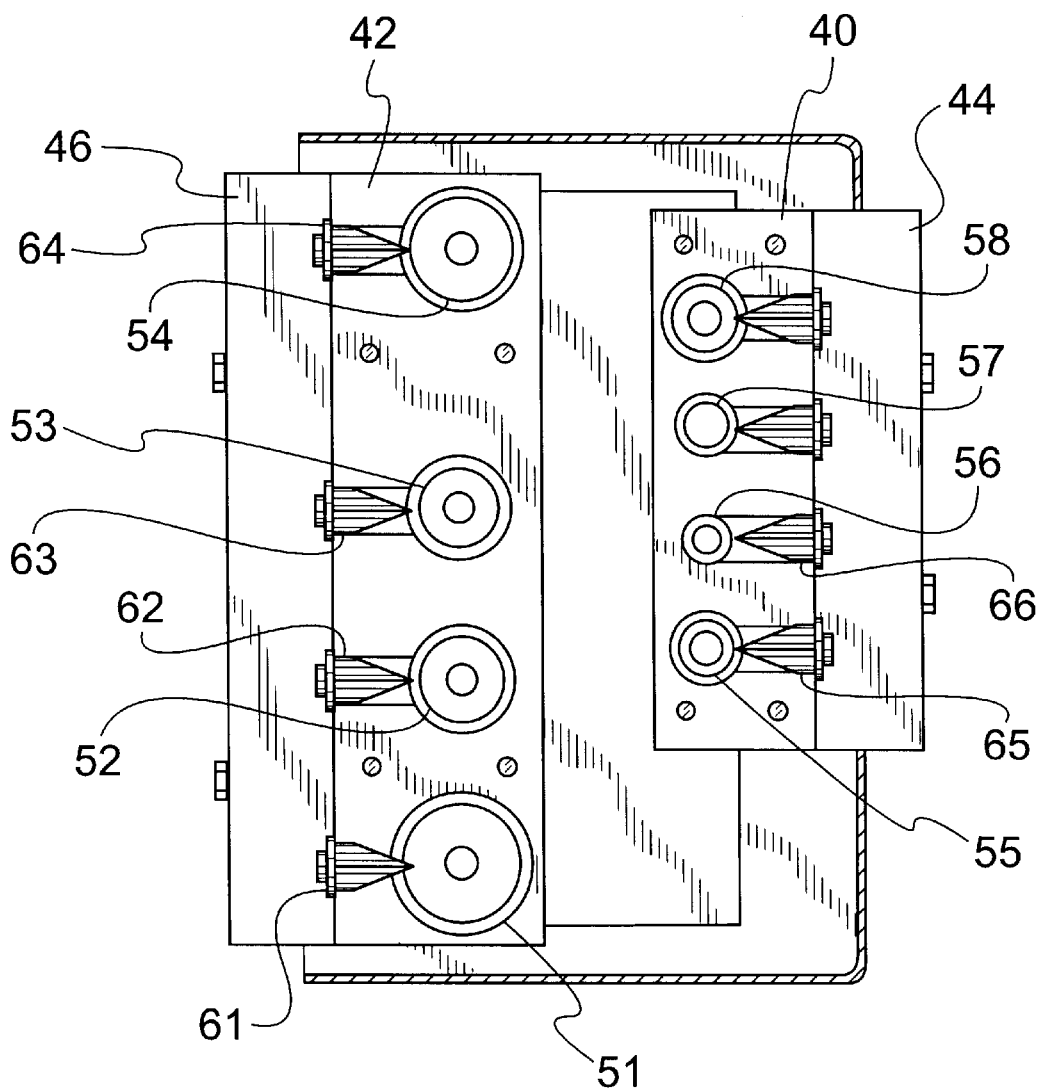
FIG. 3 is a top view illustrating the preferred cylinder blocks and supply conduits.

Each cavity has an inlet and an outlet through which pizza sauce passes during operation of the apparatus. Each inlet allows pizza sauce to flow into the chamber, and each outlet allows pizza sauce to flow out of the chamber. As shown in FIGS. 1 and 3, supply conduits, preferably supply lines 44 and 46, are mounted to the sides of the cylinder blocks 40 and 42. Each of the supply lines 44 and 46 has a central passage with four lateral passages that align with the inlets 61–68 to the cavities 51–58. During operation of the machine, the passageways of the supply lines 44 and 46 are in fluid communication with a reservoir containing pizza sauce and with the chambers of the cavities.

A one-way check valve, preferably a duck-bill type check valve sold by Vernay Corporation, is mounted between the supply lines 44 and 46 and the cavities 51–58, preferably in each cavity inlet 61–68, to permit pizza sauce to flow from each supply line into each chamber, but not in the opposite direction. The outlets of each cavity, which are formed at the bottom end of the cavities 51–58, contain a second check valve. The check valves are mounted between the chamber and the nozzle (described below), preferably in the outlets formed through the floors of the cylinder blocks 40 and 42, to permit pizza sauce to flow downward out of each chamber toward its nozzle, but not in the opposite direction. This arrangement of inlet and outlet check valves permits sauce to flow into the chambers from the supply lines when the pistons are displaced upwardly, thereby decreasing the pressure in the chambers. Furthermore, the sauce flows out of the chambers through the outlets when the pistons are displaced downwardly, thereby increasing the pressure in the chamber.

Figure 7:
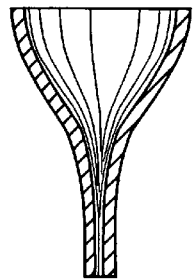
FIG. 7 is a side view in section illustrating the preferred nozzle.
Figure 8:
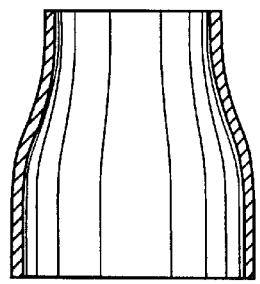
FIG. 8 is an end view in section illustrating the preferred nozzle.
Figure 9:
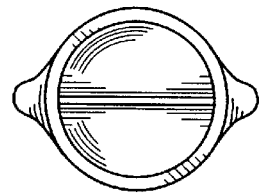
FIG. 9 is a top view illustrating the preferred nozzle.

Upon flowing out of each chamber through the outlet, the sauce is injected into an associated nozzle. The preferred nozzle shape is shown in FIGS. 7, 8 and 9, having a circular inlet end and a flattened outlet nozzle end. When sauce enters the nozzle from a cavity's outlet, the sauce flows to the flattened outlet nozzle end, from which it pours onto the pizza crust in a thin, flat "ribbon" shape. The nozzles, preferably one per cavity connected in fluid communication with each chamber, direct the dispensed sauce "ribbon" onto the upper surface of the pizza crust. As is described in more detail below, the nozzles dispense the sauce at a controlled width to form the "ribbon" shaped lines of sauce upon the crust below as the crust rotates about its center. And due to their relative positions, the plurality of nozzles dispense the "ribbons" onto the crust in a slightly overlapping manner, thereby creating an even, consistent, circular sauce layer over the designated area of the crust.

Figure 12:
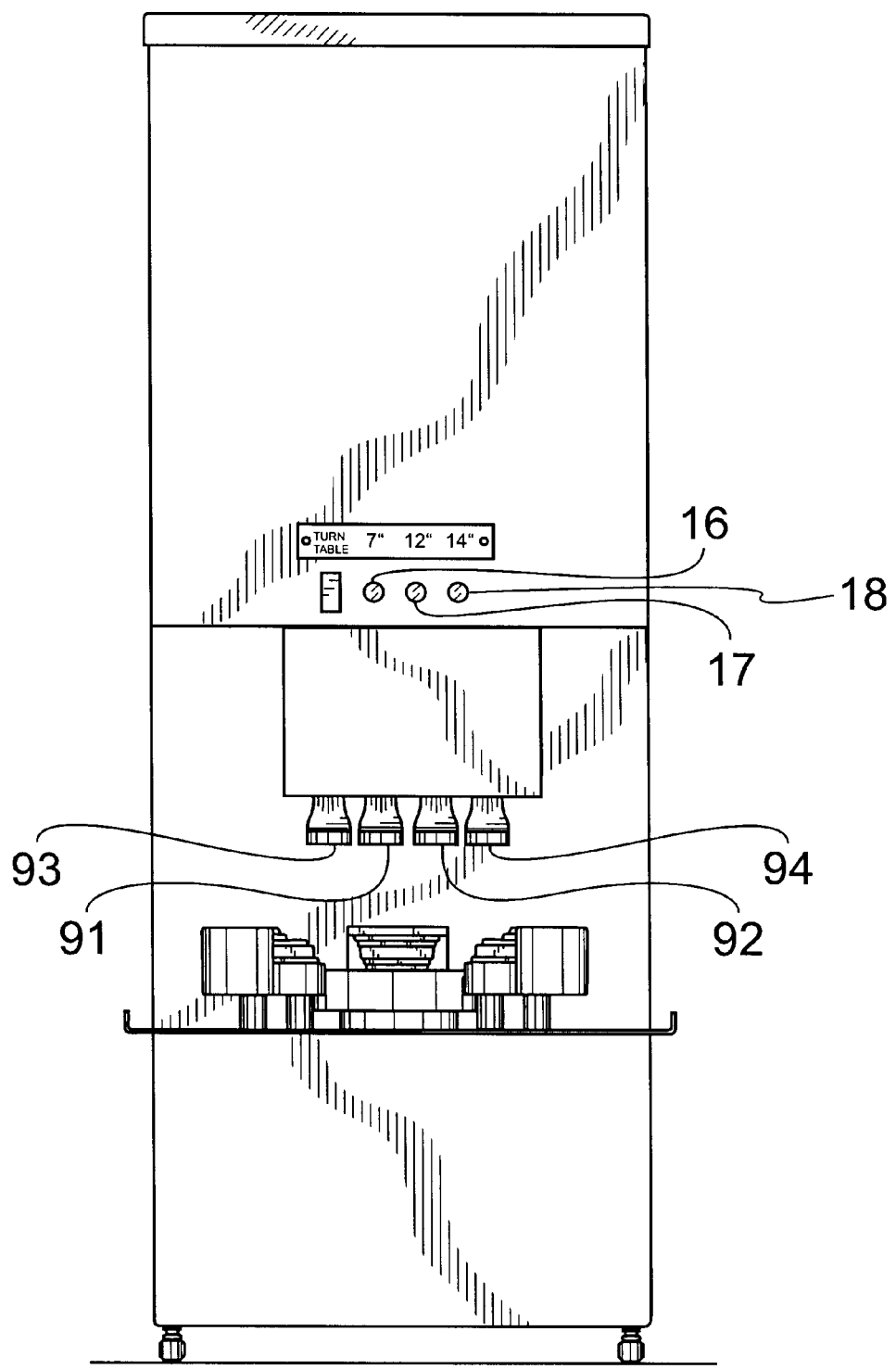
FIG. 12 is a front view illustrating the preferred embodiment of the present invention.

The prime mover 20 is connected to a central processor, which is preferably a conventional controller (not shown). The controller is connected to a series of manually actuatable switches, such as finger-depressible buttons 16, 17 and 18 (see FIG. 12), that the operator of the machine depresses according to the size of the pizza crust upon which the operator wishes the machine to dispense sauce. Thus, it can be understood from the above description that when the appropriate switch 16, 17 or 18 is depressed by the operator, the prime mover 20 is actuated by the controller to displace the drive shaft 22 and drive plate 24 downwardly from an extreme upper position toward an extreme lower position. And the pistons drivingly linked to the drive plate 24 are also forced downwardly, thereby expelling sauce contained within the associated chamber out of the nozzle and onto the pizza crust's surface. When sauce is forced out of the cavities 51–58 during the downward stroke of the pistons, no sauce is forced into the supply lines 44 and 46, because the inlet check valves prevent the flow of sauce in this direction.

The stroke length of the preferred prime mover 20 is fixed, and therefore the pistons 31–38 all have different diameters. This is because each nozzle has to dispense a different quantity of sauce due to the different radial positions of each nozzle. The preferred diameter range of the pistons is from $7/16$ inches to one and $5/8$ inches. The preferred longitudinal displacement (stroke) of the prime mover 20 is two inches. Of course, these dimensions can be changed to suit a particular application.

Once the pistons have been driven to their extreme lower position, the prime mover 20 drives them upwardly, thereby filling the cavities with sauce from the supply lines on the up-stroke. No air or other fluid is drawn into the cavities through the outlets, because the outlet check valves prevent fluid flow in this direction.

Figure 11:
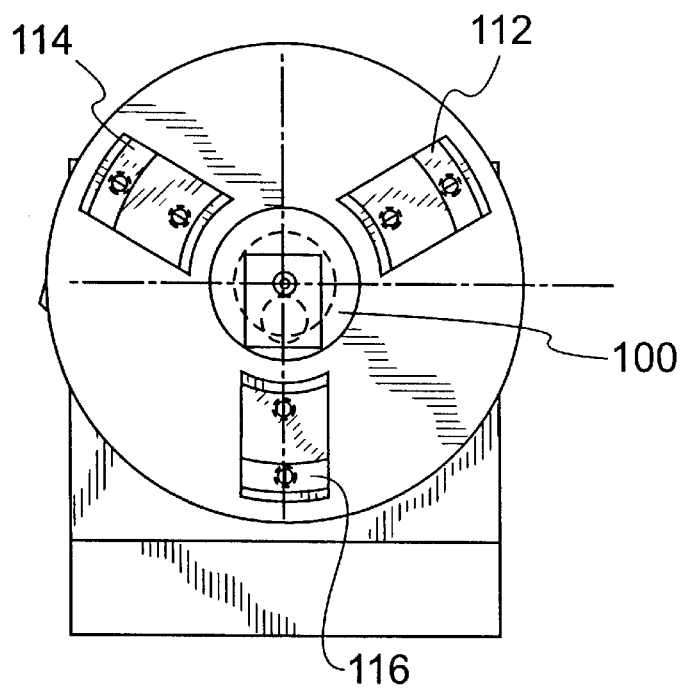
FIG. 11 is a top view illustrating the stationary platforms and the turntable.
Figure 10:
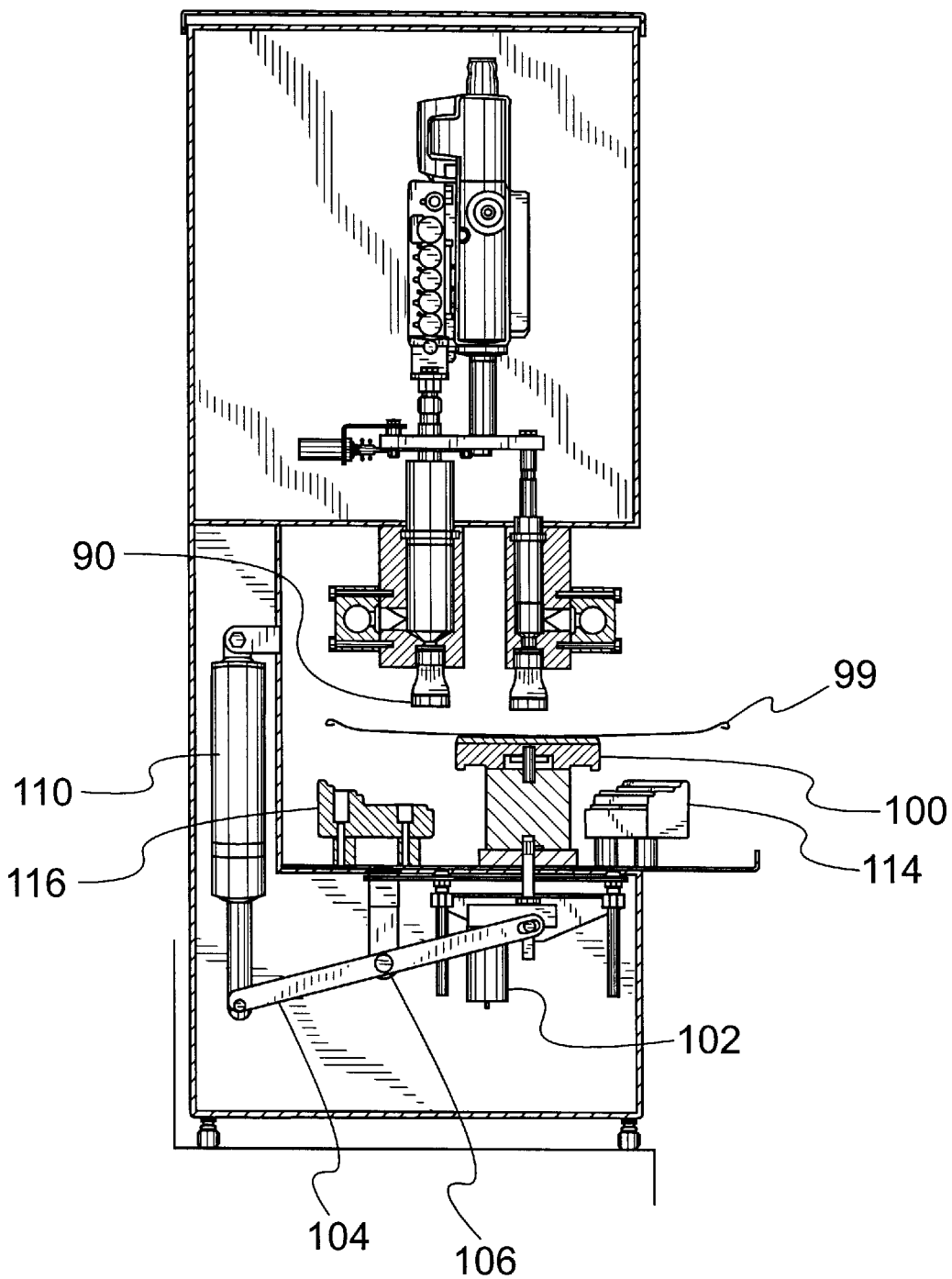
FIG. 10 is a side view in section illustrating the turntable in the raised position.

Turning to FIGS. 1, 10 and 11, a pizza crust tray 99 is shown resting upon a turntable 100. The turntable 100 is rotatably mounted to the housing 10, and is drivingly linked to a prime mover, preferably the rotary gear motor 102. The motor 102 is connected to the controller, which actuates the motor 102 to rotate the turntable 100 at a precisely controlled velocity a predetermined number of, or fraction of, revolutions. In the preferred embodiment, the motor 102 is controlled to rotate the turntable 100 approximately one revolution during dispensing of the sauce from the nozzles 91–98.

The turntable 100 is also configured to be displaced vertically from its lower extreme position shown in FIG. 1 to its upper extreme position shown in FIG. 10. One end of a lever arm 104 is pivotably mounted to the lower end of a tray on which the turntable 100 is mounted, and an opposite end of the lever arm 104 is pivotably mounted to a linear prime mover, preferably the linear actuator 110. The center of the lever arm 104 is mounted at a fulcrum 106 connected to the housing 10. The linear actuator 110 is connected to the controller, and the controller actuates the linear actuator 110 to displace the connected end of the lever arm 104 downwardly, causing the lever arm 104 to pivot about the fulcrum 106 and displacing the opposite end of the lever arm 104 upwardly. This upward displacement thereby displaces the turntable upwardly. The controller actuates the linear actuator 110 to displace the turntable 100 downwardly.

As illustrated in FIG. 11, there are three stationary platforms 112, 114 and 116 mounted in the workspace 12 of the housing 10. The platforms have an upper surface with multiple surfaces of different heights separated by shoulders that are different radial distances from the turntable 100. These platforms have a "terraced" structure inasmuch as their structures accommodate a plurality of pizza crust pan diameters, preferably three, and center them all on the turntable. Of course, more or fewer than the number of terraces for three pan sizes are possible. For example, the pan 99 shown in FIG. 1 is a fourteen inch pan, and it rests on the upper terrace of each of the stationary platforms 112, 114 and 116. A smaller crust rests on one of the lower terraces of each of the platforms 112, 114 and 116. All three pans are centered precisely on the turntable, regardless of their diameter, because of the shoulders of the platforms, all of which are spaced radially from the turntable.

When the turntable is raised by the linear actuator 110, the pan (and its crust) is lifted off of the stationary platforms 112, 114 and 116 to a position directly beneath the nozzles. A predetermined gap is formed between the nozzles and the upper surface of the crust. The size of this gap depends upon sauce characteristics, nozzle size and other factors, but for the preferred embodiment is on the order of one-half to five-eighths inches and is fixed once the sauce characteristics are determined. Once the turntable 100 is raised to the extreme upper position, the pizza crust is positioned the predetermined distance beneath the nozzles. This predetermined distance, once fixed, is the same for all crust sizes, despite the fact that smaller pans begin at a position on the stationary platforms lower than larger pans due to the terracing of the stationary platforms 112, 114 and 116.

The nozzles 91–98 are mounted to the lower ends of the cylinder blocks 40 and 42 with their fluid passageways in fluid communication with the chambers above. A quick-disconnect structure on each nozzle includes two prongs that extend from the nozzle radially oppositely to one another and perpendicular to the axis of the nozzle. The two prongs extend into a circumferential groove around an interior sidewall of a tubular fitting that is mounted at the outlet of the cavity. The nozzle is placed in the fitting with the prongs in the groove, and is rotated until the two prongs seat against stops in the groove. The rubber check valve in each outlet has a flange at its upper end that is champingly interposed between the nozzle and the tubular fitting, thereby creating a tight seal and a bias locking effect that holds the nozzle in place. This structure permits one to remove the nozzles for cleaning, but makes it easy to align the slot of the nozzle radially when returning the nozzle to its place on the machine.

Figure 13:
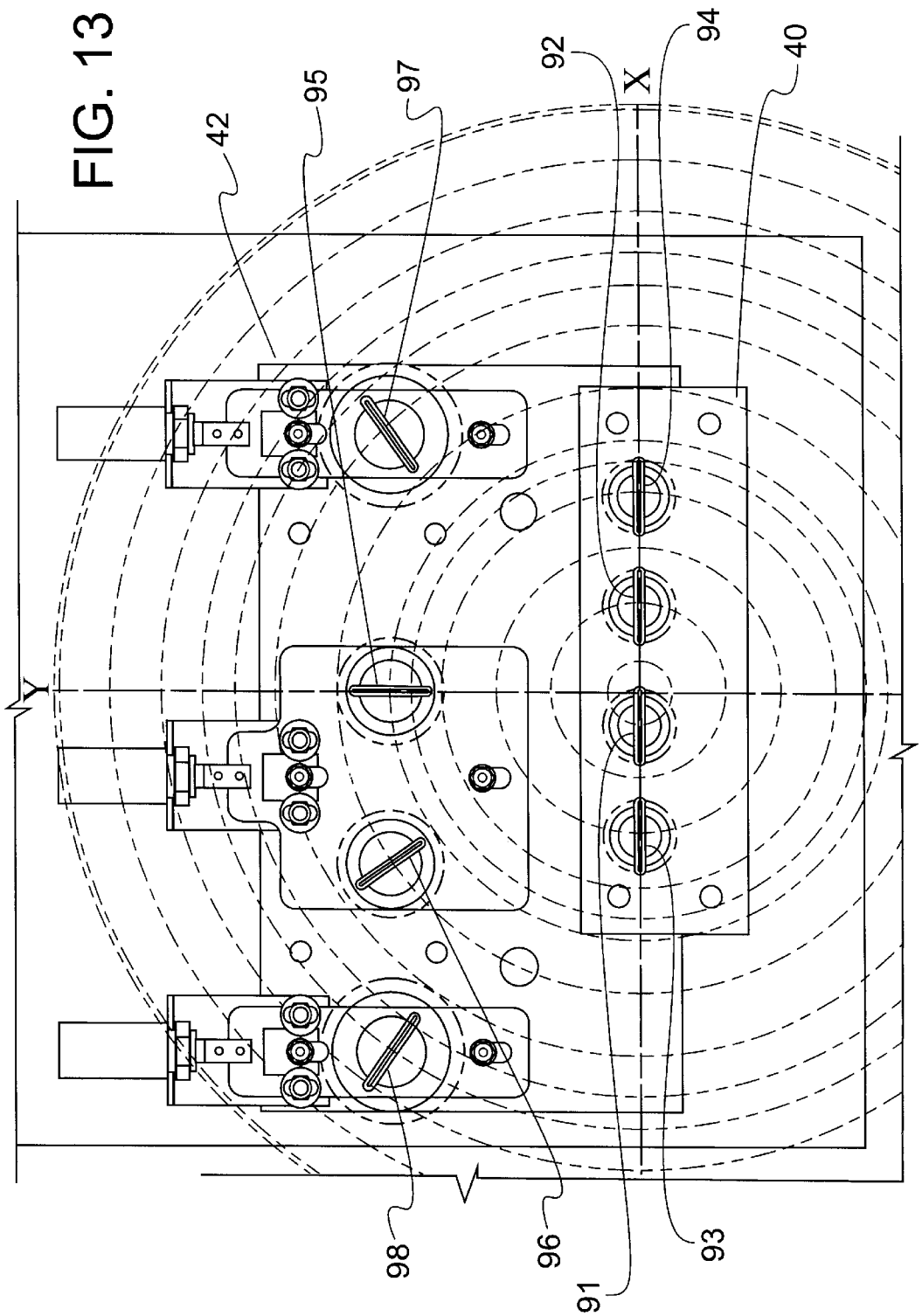
FIG. 13 is a top view illustrating the positions of the nozzles in the preferred embodiment.

The nozzles 91–98 are arranged as shown in FIG. 13 to direct the sauce dispensed from the cavities 51–58 during downward displacement of the pistons 31–38 onto the upper surface of the rotating pizza crust. The nozzles apply the "ribbons" of sauce at carefully selected positions on the surface of the circular crust. Each nozzle is positioned at a unique radially spaced position from the center of the crust.

Figure 14:
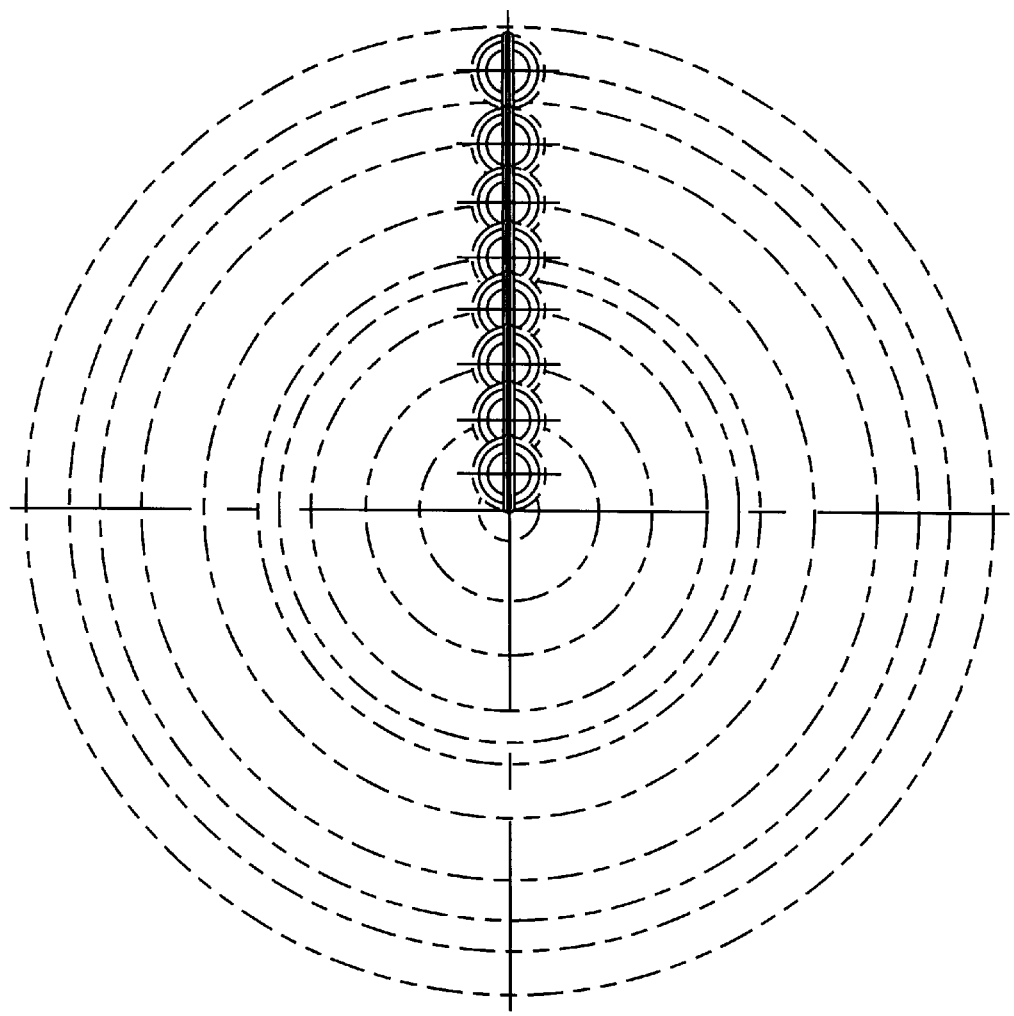
FIG. 14 is a top view illustrating the relative radial locations of the nozzles.

If one were to align all of the nozzles 91–98 along a single radial line while maintaining their radial distances from the crust's center, the nozzles would appear as they do in the illustration of FIG. 14. However, the nozzles are not arranged as shown in FIG. 14 because their physical dimensions will not permit this arrangement.

Each nozzle has a flattened end with a slot having a length aligned radially of the circular pizza crust. Each slot length is either approximately seven-eighths to one and three-sixteenths inches, which is slightly greater than the radial spacing of the centers of the nozzles of about one inch. The nozzle dimensions and radial spacing require that the nozzles be spaced from one another circumferentially as they are shown in FIG. 13. The position of each nozzle is also determined by taking into consideration the desire to have all of the nozzles positioned essentially directly below the pistons and at points that apply an even load (caused by the pistons 31–38 compressing the sauce in the cavities 51–58) on the prime mover 20 that displaces the drive plate 24. Both factors affect the positions of the nozzles 91–98 and pistons 31–38.

The positions at which the nozzles 91–98 are located in the preferred embodiment can be described in rectangular coordinates (ordinate, abscissa) in relation to the position of each nozzle on a conventional x-y axis based upon the number of inches from the origin. In the illustration of FIG. 13, the origin of the x-y axis is positioned directly over the center of the pizza crust.

The most radially inward nozzle 91 is aligned with its radially inward end positioned directly over the origin. The center of the nozzle 91 is located at (0.43,0). The center of the second most radially outward nozzle 92 has the coordinates (1.19,0). The center of the third most radially outward nozzle 93 has the coordinates (1.94,0). The center of the fourth most radially outward nozzle 94 has the coordinates (2.69,0). The nozzles 91–94 are all mounted beneath the cylinder block 40, and all of them are aligned along a line that lies on the x-axis. The nozzles 95–98 are all mounted beneath the cylinder block 42, and all of them are aligned along a line that lies on the fifth abscissa. Thus, the center of the fifth most radially outward nozzle 95 has the coordinates (0,3.42), the center of the sixth most radially outward nozzle 96 has the coordinates (−2.35,3.42), the center of the seventh most radially outward nozzle 97 has the coordinates (3.65,3.42) and the center of the eighth most radially outward nozzle 98 has the coordinates (−4.94,3.42).

The turntable 100 is actuated by the controller to rotate, thereby rotating the pan and crust resting thereon, about the center point of the crust. As the turntable rotates, the drive plate 24 is actuated to displace the drive shaft 22 at a rate which is carefully timed to displace the pistons to dispense pizza sauce during approximately 360 degrees of rotation of the pan. The controller controls the timing and actuation of each element to which it is connected. Because the rotational speed of the motor 102 is relatively constant and known, the amount of time it takes for the motor 102 to drive the turntable 100 one complete rotation is essentially fixed, and therefore the prime mover 20 is started and stopped based upon the amount of time it takes for a full rotation of the turntable 100.

All of the nozzles 95–98 have slot lengths aligned radially to the circular pizza crust, and therefore when sauce pours out of the slots, the sauce falls onto the rotating crust to form circumferential ribbons of sauce. Furthermore, the sauce falls at different radial and circumferential starting and stopping points during crust rotation. And the ribbons of sauce will overlap at their lateral edges to form, upon complete rotation of the crust, a contiguous circular layer of sauce on the upper surface of the crust extending from the center of the crust to the outermost peripheral edge of the outermost ribbon of sauce. The overlapping may be on the order of one-sixteenth to one-eighth of an inch.

As is normally the case in a pizza restaurant, there is often a desire to coat more than one size pizza crust with sauce. The preferred machine is designed to accommodate this desire by dispensing, upon manual selection, a different amount of sauce for different diameters of pizza crusts. In order to accomplish this, some of the pistons are disconnected from the prime mover 20 when a pizza crust of a smaller diameter is to be coated, so that no sauce is dispensed from the associated nozzle or nozzles.

For example, the preferred machine can coat pizza crusts of seven, twelve and fourteen inch diameters. Of course, the machine could be adapted to coat crusts of more or fewer, and smaller or larger, diameters than those specified, as will become apparent to those of ordinary skill in the art. In the preferred embodiment, all pistons are displaced by the prime mover when a pizza crust fourteen inches in diameter is to be coated with sauce. Thus, when coating of the largest size crust occurs, all pistons are displaced and pizza sauce is dispensed from all nozzles onto the whole surface of the crust.

Figure 4:
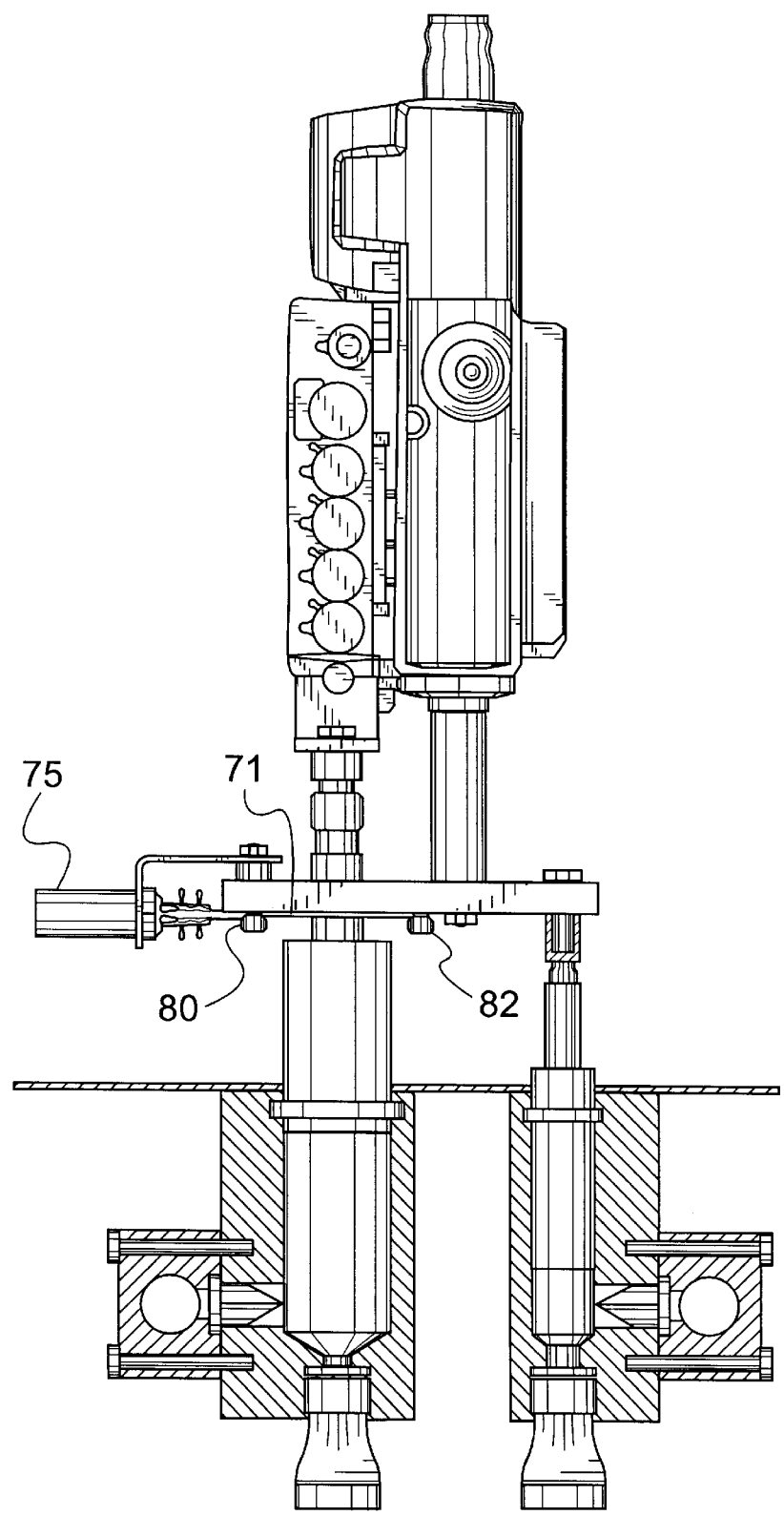
FIG. 4 is a side view in section illustrating the preferred prime mover, drive shaft, drive member and piston rods.
Figure 5:
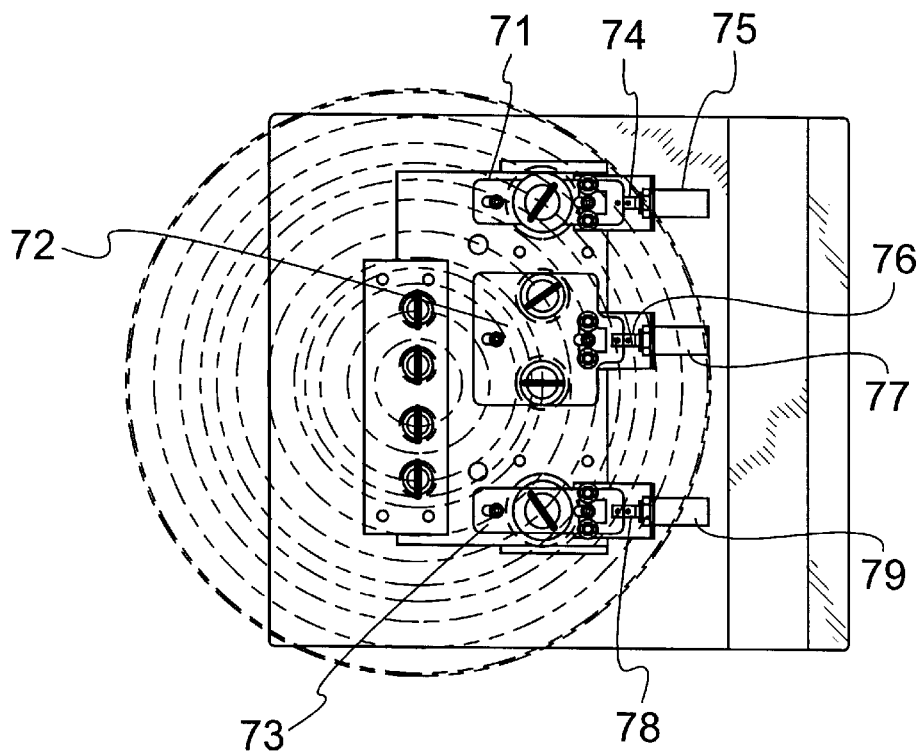
FIG. 5 is a top view illustrating the solenoids and locking tabs.

Alternatively, when a smaller pizza crust, of for example seven or twelve inches in diameter, is to be coated, one or more of the pistons is released from its driving connection to the prime mover, and is not driven during the coating cycle. This disconnection is accomplished, in the preferred embodiment, by a plurality of solenoids 75, 77 and 79 that are connected to the central controller and have housings that are mounted to the drive plate 24 as shown in FIGS. 4 and 5. Each of the solenoids 75, 77 and 79 has a linearly driven drive shaft 74, 76 and 78, respectively, that is drivingly linked to one of three locking tabs 71, 72 and 73, respectively, that are slidably mounted to the underside of the drive plate 24. The locking tabs 71–73 are preferably slidably mounted by a pair of screws 80 and 82 (see FIG. 4) that slidably extend through elongated slots in the tabs and rigidly mount into the drive plate 24. The locking tabs 71–73 can slide within their planes, as permitted by the elongated slots, but cannot move perpendicular to their planes as prevented by the screw heads seating against the faces of the locking tabs.

Figure 6:
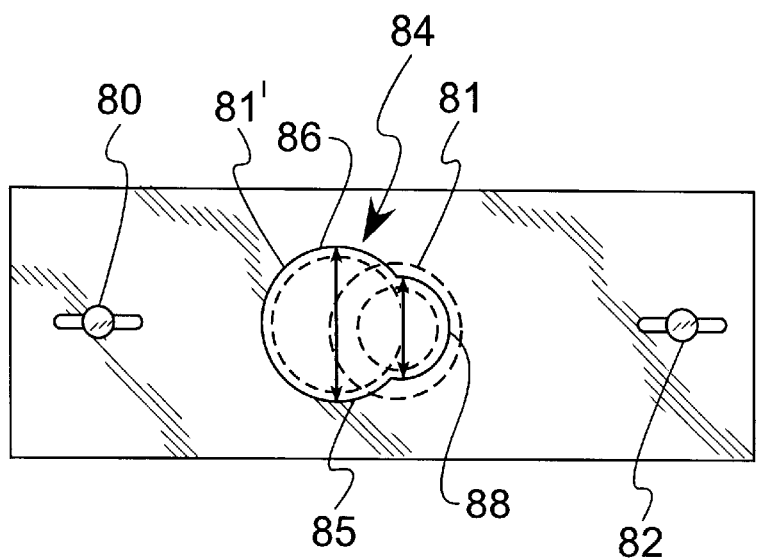
FIG. 6 is a top view illustrating a locking tab.

As shown by way of example in FIG. 6, each locking tab has a central aperture 84 with two sections. Each section has a different width, with the width 88 being greater than the width 86. The larger width 88 is slightly greater than the diameter of the piston rod, which is shown in phantom as reference numeral 81'. Each piston rod has a necked region near its upper end where a circumferential groove is formed around the outer surface of the piston rod, and the diameter of the piston rod in the necked region, shown in phantom as reference numeral 85, is slightly smaller than the smaller width 86.

Thus, when the locking tab is in its normal position, the section of the aperture 84 with the smaller width 86 is inserted in the necked region 85, thereby locking the piston rod, shown in phantom as reference numeral 81, to the drive plate 24. The piston rod drivingly linked in this manner to the drive plate 24 is driven longitudinally by the longitudinal movement of the drive plate 24. However, when the solenoid is activated, the locking tab is displaced by the solenoid's drive shaft until the drive rod is surrounded by the larger width 88, at which time the drive rod is no longer drivingly linked to the drive plate 24, and the drive plate 24 can move longitudinally relative to the piston rod.

The only opportunity for linking of the piston rod to the plate is when the drive plate 24 is at the extreme upper position. At this position, the locking tabs can be displaced into or out of the necked regions of the piston rods.

When one of the normally depressible buttons 16 or 17 that is associated with a pizza crust smaller than fourteen inches is depressed, the connected controller actuates one or more of the solenoids 75–79 to displace one or more of the locking tabs 71–73, thereby removing the driving link between the drive plate 24 and the pistons that are desirably not driven. Thus, the drive plate 24 is always driven on a down and then up cycle every time a pizza crust is coated, but where a piston's associated solenoid is activated to remove the link between the drive plate 24 and the piston, that particular piston is not driven during that cycle. But where a solenoid is not activated, a driving link remains.

For example, with reference to FIGS. 3 and 5, the pistons 55–58 are always drivingly linked to the drive plate 24 in order always to coat the inner seven inches of crust diameter. However, the pistons 31–34 are selectively linked to the drive plate 24 by the locking tabs 71–73 to selectively coat the outer seven inches of crust diameter. When the solenoids 75, 77 and 79 are not activated, the locking tabs 71–73 lock the pistons 35–38 to the drive plate 24 and all pistons are driven downwardly by the drive plate 24 to coat a fourteen inch crust. However, if the locking tab 71 is displaced by the solenoid 75, the piston 31 is disconnected from its driving link to the drive plate 24. Therefore, when the drive plate 24 is displaced downwardly by the prime mover 20, the piston 31 will not move with the drive plate 24. Instead, it will remain immobile, and unlinked to the drive plate 24, thereby dispensing no sauce from the outer nozzle 98. This condition will remain until the drive plate 24 is driven upwardly to its upper extreme position and the solenoid is not activated.

The piston 31 will be disconnected from the drive plate 24 as previously described, for example, when a twelve inch crust is being coated with sauce. The piston 31 dispenses sauce that coats the outer one inch ribbon of sauce on a fourteen inch diameter crust with sauce. That outer one inch ribbon is not needed on a twelve inch diameter crust.

As another example, a seven inch crust may be coated with sauce. Then the solenoids 77 and 79 are activated in addition to the solenoid 75, thereby releasing the links between the pistons 31–34 and the drive plate 24. This configuration causes only the pistons 35–38 to be driven downwardly to dispense sauce, thereby coating only the inner seven inches of pizza crust diameter with sauce.

Thus, it can be seen that the operator of the preferred machine places the crust on the stationary platforms, which center the crust over the turntable, depresses the button 16, 17 or 18 appropriate for a crust of a particular diameter, and waits for the crust to be coated. Once depressed, the switch 16, 17 or 18 signals the controller as to the diameter of the crust, and the controller actuates the linear actuator 110 to displace the turntable 100 upwardly to its extreme upper position near the nozzles 91–98. Once the turntable 100 has raised the crust to the desired position, the turntable 100 begins to rotate, and the prime mover 20 displaces the drive plate 24, and all linked pistons, downwardly to dispense sauce out of the cavities containing pistons that are being displaced. The nozzles in fluid communication with those cavities direct the sauce downwardly onto the rotating crust, thereby coating the crust during complete rotation thereof.

After the crust is coated, the controller actuates the linear actuator 110 to displace the crust downwardly to the position where the operator knows to remove it for application of other toppings. Additionally, the prime mover 20 displaces the drive plate 24, and any linked pistons, upwardly, thereby drawing sauce into the cavities containing pistons that were displaced during the cycle. At this point, the machine is ready to coat another pizza crust, and the operator removes the coated crust.

The preferred prime mover control box/power supply is a Linak CBO9, the preferred prime mover 20 is a Linak LA31, and the preferred linear actuator 110 is a Linak LA12. The preferred controller is a Telemecanique SR1A201BD, but might be substituted by a Siemens Logo 6ED10531FB00-0BA2 or similar controller.

The definition used for the terms cylinder and cylindrical are the proper mathematical definitions for these terms. A cylinder can include any polygon translated into three dimensional space, and specifically includes circular cylinders and any other polygonal cylinders, such as oval or rounded rectangular cylinders.

Figure 15:
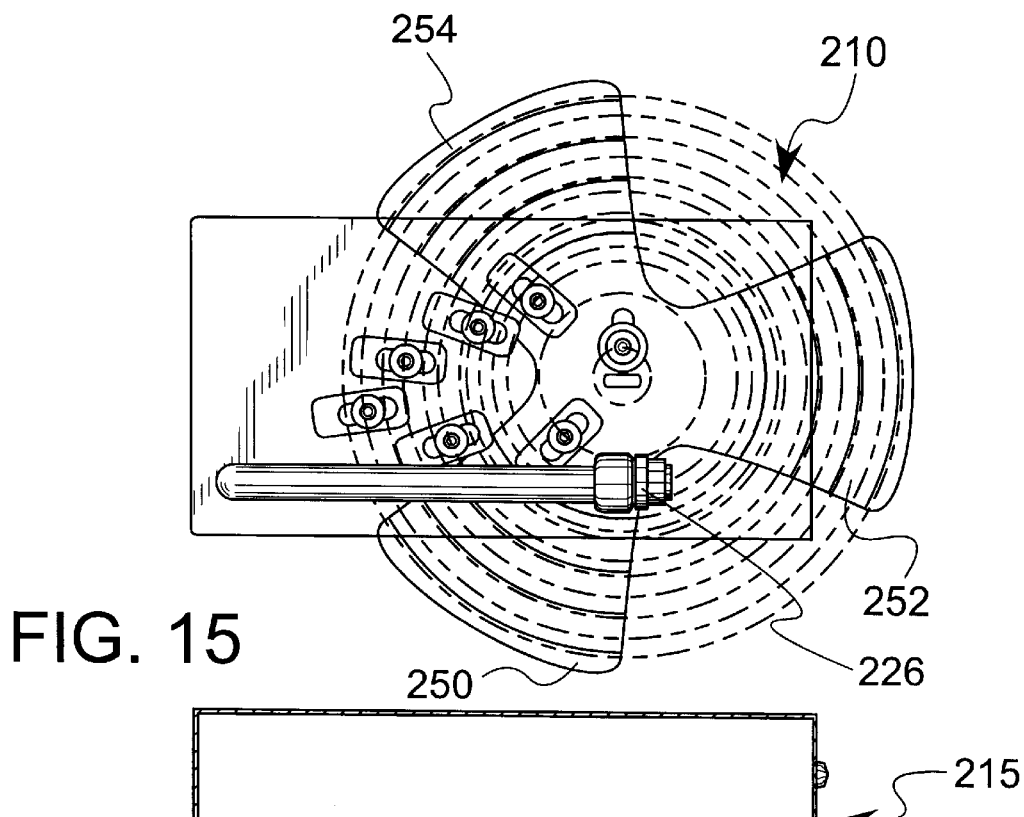
FIG. 15 is a top view illustrating an alternative embodiment of the present invention.
Figure 16:
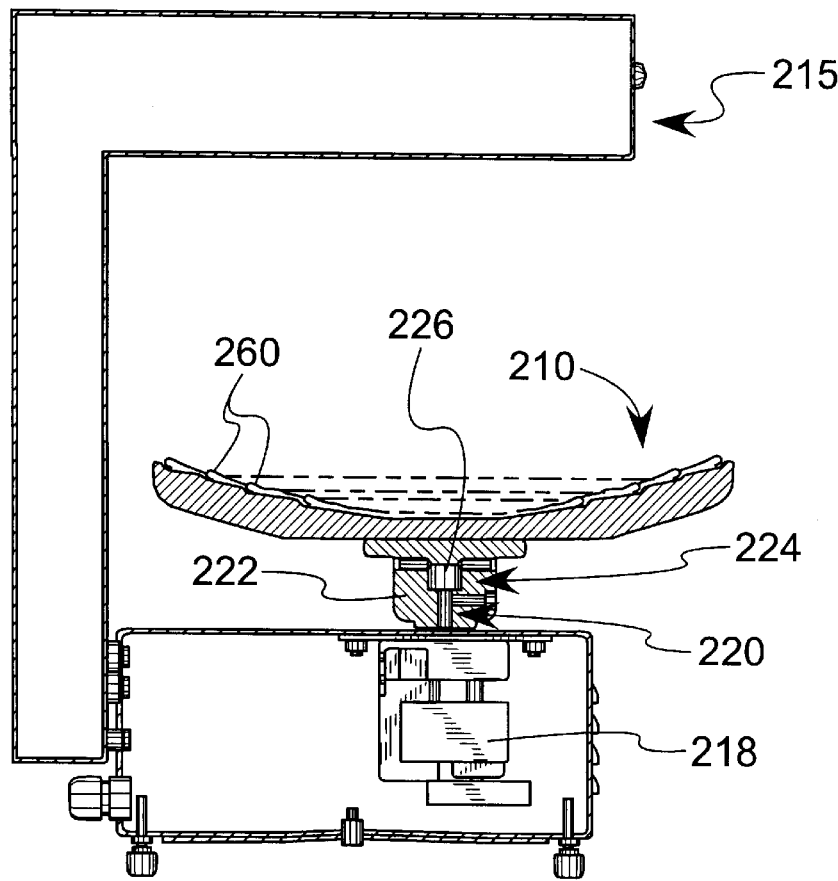
FIG. 16 is a side view illustrating an alternative embodiment of the present invention.

An alternative embodiment of the present invention is shown in FIGS. 15 and 16. The alternative embodiment coats crusts one at a time by using a motor to rotate a round crust about its center while one or more radial lines of nozzles dispense sauce onto the crust. A conventional pizza crust sits in a conventional round pan on the support 210 and is rotated beneath an arm 215. The crust support 210 is driven by a gear motor 218. The gear motor's drive shaft 220 is mounted to a cylindrical body 222. A drive rod 226 extends downwardly from the crust support 210 into a vertical passage 224 in the cylindrical body 222.

The cylindrical body 222 has a pair of opposing biased plungers that are mounted so that they protrude into the vertical passage in the cylindrical body 22. The plungers function similarly to the biased ball on the shaft of a conventional socket wrench that keeps sockets from falling off of the shaft. Each plunger can insert into an indentation on the outside of the drive rod 226. It is this structure that causes the cylindrical body 222 drivingly to engage the drive rod 226.

When the operator wants to put sauce on the crust, he places the crust in a pan on the support 210. Before doing so, he stops the rotation of the support 210 with his hand. When the support 210 is stopped, the gear motor's shaft continues to rotate. The cylindrical body 222 revolves around the drive rod 226, with the spring-loaded plungers plunging in and out of the indentations. This occurs until the support 210 is released and then the drive shaft 220 drives the support 210.

Once the support 210 is driven, the operator presses a button corresponding to the diameter of the pizza crust. The mechanism that pumps the liquid sauce dispenses sauce out of as many of the nozzles aligned along a radius of the crust as are necessary to coat the crust. For example, if the crust is 12 inches in diameter, then the nozzles that dispense in a line six inches long are made to spray. This dispensing occurs during the 360-degree rotation of the crust following pressing of the button, and then the pump that dispenses the sauce is controlled to shut off.

Figure 17:
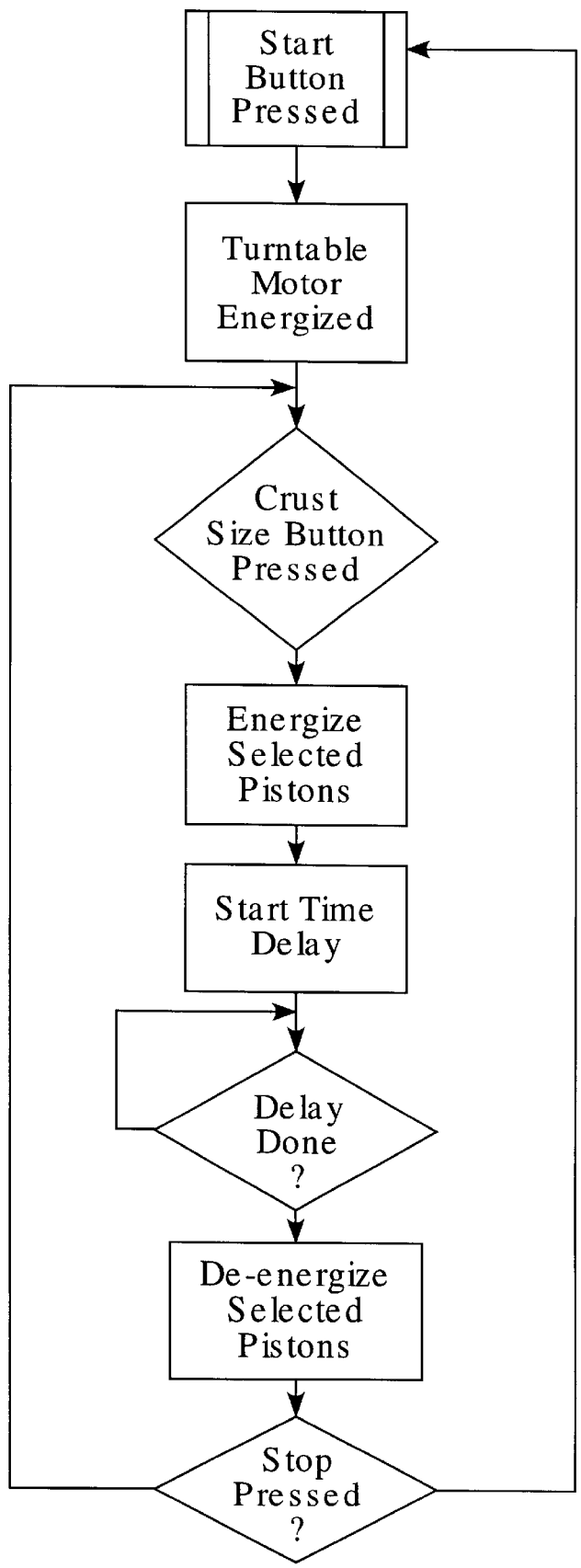
FIG. 17 is a flow chart.

There are four crust size pushbuttons, each representing a particular crust size, that when pushed activate one or more selected pistons. A separate "start/stop" pushbutton activates the gear motor that continuously rotates the crust and allows the four pushbuttons to pass signals (current) to the controller board or embedded computer. When the start/stop button is first pressed, the turntable rotates continuously. After a crust size pushbutton is pressed, the controller board activates a solenoid valve or valves for a specific time. After the time has expired, the solenoid valve is deactivated. This process applies a specific quantity of sauce to the crust within one revolution of the crust and turntable. The finished crust is then removed by the operator and the process can be repeated. The electrical controls are mounted inside a sealed enclosure with cables connecting the wiring to the sauce applicator. This process is best illustrated in the flow chart labeled as FIG. 17.

The support 210 has three paddles 250, 252 and 254 extending radially outwardly from a central point. Each of the three paddles has multiple terraced landings 260 at different horizontal levels and spaced predetermined radial distances from the support's axis of rotation, thereby aligning three of each equally radially positioned landings to form a plurality of circular supports for pizza pans of different sizes (as shown in phantom).

Figure 18:
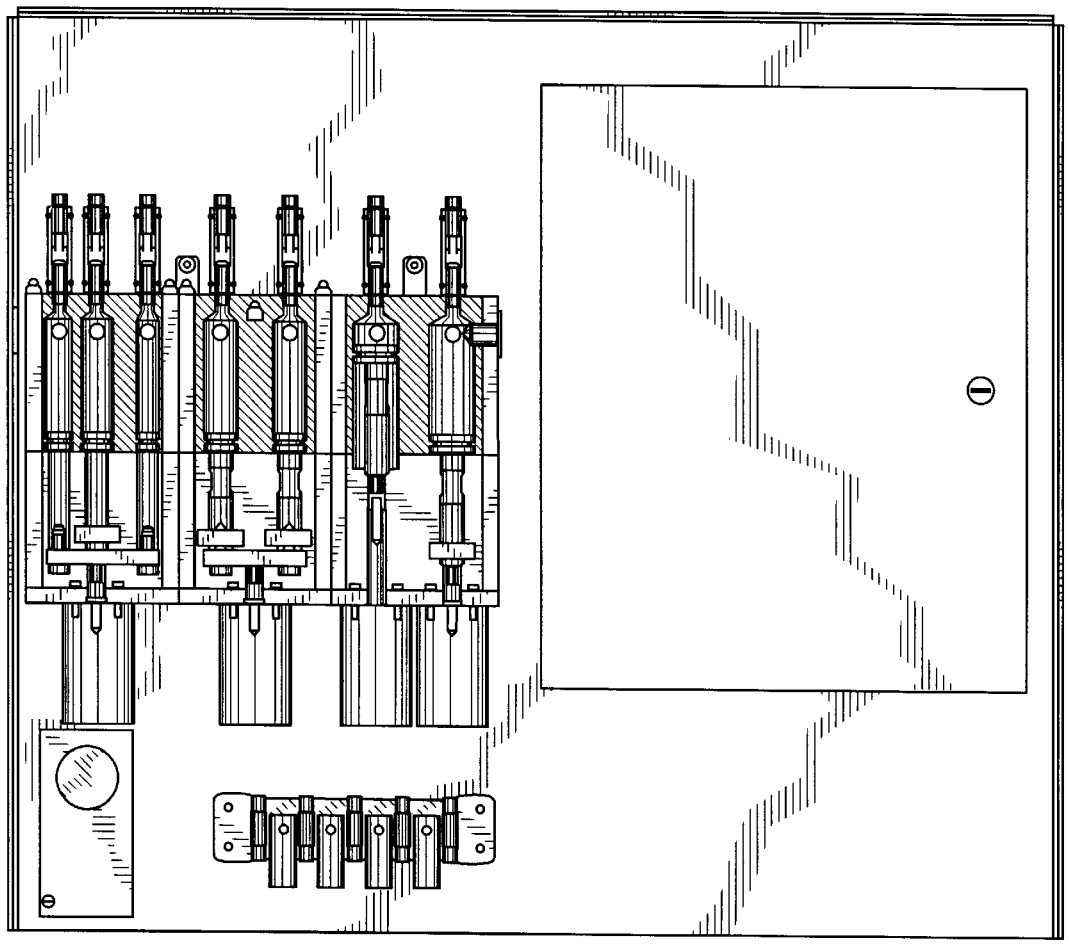
FIG. 18 is a side view illustrating an alternative pumping means.
Figure 19:
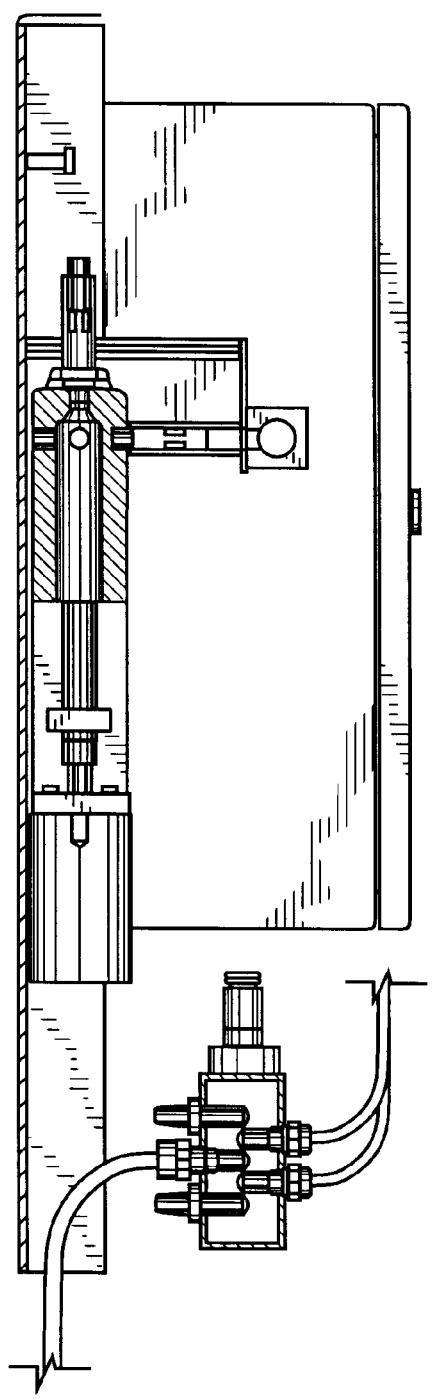
FIG. 19 is an end view illustrating an alternative pumping means.
Figure 20:
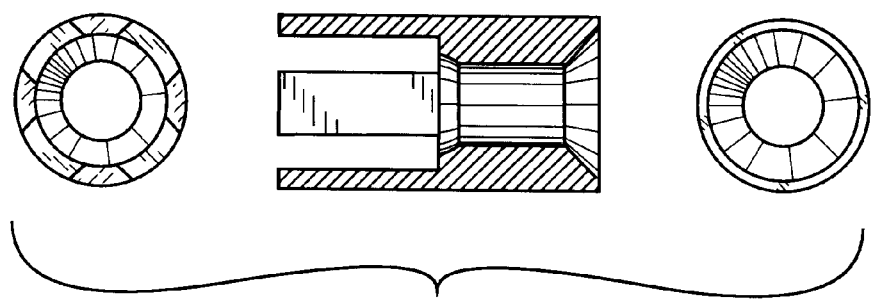
FIG. 20 is a side view of an alternative valve.

An alternative device used to pump the sauce is shown in FIGS. 18 through 20. The pump has one or more piston cylinders formed in a preferably polymer (as is sold under the trademark DELRIN) cylinder block. Stainless steel pistons, with O-rings for sealing, are slidably mounted within the cylinders, one piston per cylinder. Inlet and outlet ports are formed at the ends and sides, respectively, of the cylinder block to permit the fluid, such as pizza sauce, to be drawn into and out of, respectively, the cylinders. Transparent or translucent tubing extends from the inlet and outlet ports to the supply of pizza sauce and the outlet of the sauce, respectively. The outlet is preferably a dispensing nozzle.

The pistons, whether one or more per cylinder block, may be all drivingly linked to a single prime mover, such as a pneumatic cylinder, to drive the piston(s) synchronously in one direction to draw sauce into the pump and in the opposite direction to force sauce out. Pistons which are drivingly linked provide simultaneous flow of sauce through multiple nozzles to specific zones on the crust. The pistons, when more than one per cylinder block, may also be independently driven by multiple prime movers, such as pneumatic cylinders, to drive the pistons separately in one direction to draw sauce into the pump and in the other direction to force sauce out. The piston rods are threaded near their connection with the prime mover, thereby allowing attachment of a movable stroke-limiting collar. The collar, being threaded to match the piston rod, may be rotated in one direction, causing it to collide with the cylinder block before the piston has reached its fall stroke, thereby decreasing the piston's displacement. In like manner, the threaded collar may be rotated in the opposite direction to increase the displacement of the piston.

Figure 21:
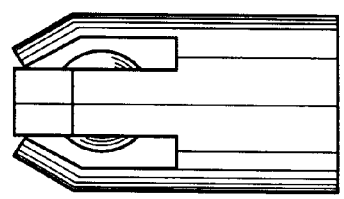
FIG. 21 is a side view of the alternative valve in the assembled state.

One-way valves are inserted in the tubing near the ports to which the tubing is attached. The one-way valves are shown in FIGS. 20 and 21, and ensure that sauce can only pass into the cylinders through the inlet port, and can only pass out of the cylinders through the outlet port. In other words, because of the one-way valves, the sauce is not forced toward the supply of sauce or drawn from the nozzles to any substantial degree.

The one-way valves have a unique structure that provides advantages heretofore unknown. The valve is made of two parts: a $5/16$-inch spherical ball and an elongated valve body preferably having a circular cylindrical outer surface. The valve body is preferably machined to the dimensions and shape shown, in which there are preferably four fingers extending longitudinally from the base at approximately every 90 degrees. Of course, three or more fingers could be used, and regardless of the number of fingers, they are preferably equally spaced circumferentially around the end of the base. The base has a preferably cylindrical passage therethrough, and a concave seat at the end to which the fingers attach, against which the ball can seat during operation. Of course, the cavity could be conical, spherical or any other shape against which a ball can seat to seal the cylindrical passage.

Once the valve body is formed as shown and described, the ball is placed within the fingers and seated against or near the spherical seat. Then two of the four fingers are bent inwardly toward the axis of the valve body as shown at a point approximately 0.20 inches from the free ends of the fingers, and at an angle of approximately 30 degrees. The two fingers that are bent are on opposite sides of the valve body, and are therefore not adjacent one another in the preferred valve that has four fingers. The valve is then press-fit into the tubing so that it is visible just near the block, and is held in place within the tubing by frictional engagement between the outer surface of the valve body and the inner surface of the tubing.

Once assembled, the valve permits the flow of sauce in one direction, but prevents sauce from flowing in the opposite direction. A significant advantage of the valve is that when the piston that is being driven in one direction (to cause sauce to flow through the valve) stops and begins to move in the opposite direction, the sauce will begin to flow in the opposite direction through the tube until the ball is displaced, by the flow of sauce, to seat against the spherical seat. However, because the ball has to traverse a non-infinitesimal distance between the seat and the points on the fingers that stops the ball from exiting the valve, which is the point where the ball is located during the flow of sauce, some amount of sauce moves within the tubing before the ball seats and blocks flow.

For the present invention that may be advantageous, because a very small predetermined amount of sauce is thus pulled back toward the pump from the nozzles once the pistons change direction and begin to draw sauce into the pump. By pulling back this small amount of sauce, the check valve causes a "draw back" of the sauce to prevent dripping at the nozzles. By varying the distance between the seat and the point on the fingers that contacts the ball, the amount of draw back can be varied.

Another advantage of the valve is that, because it is anticipated that the valve will be used with food products, the valve can be seen by an operator through the walls of the tubing to determine whether all of the food particles have been cleaned from the valve. If particles remain, they will be very visible to the operator. Still another advantage of the pump is that it can be used in tandem with other pumps of one or more pumping cylinders per pneumatic prime mover to reduce the number of controls needed.

Because the density and/or viscosity of the fluid flowing through the tubing affects the flow rate through the valve, a different density and/or viscosity may necessitate a different length and/or angle of the fingers. Furthermore, the slots between the fingers leave an open space through which fluid can flow unrestricted by the ball. These slots provide an opening from the outer surface of the ball to the inner surface of the tubing, thereby accommodating fluids, such as slurries, that normally will not flow through a valve. The valve is small enough to fit in the tubing, but, because of the slots between the fingers, it provides a large enough passageway for thick, dense fluids to flow through.

While certain preferred embodiments of the present invention have been disclosed in detail, it is to be understood that various modifications may be adopted without departing from the spirit of the invention or scope of the following claims.

What is claimed is:

1. An apparatus for coating an upper surface of a substrate with fluent material, said apparatus comprising:
    (a) a housing;
    (b) a first linear prime mover connected to the housing, said prime mover having a displaceable drive shaft with a drive member rigidly mounted to the drive shaft,
    (c) a cylinder block connected to the housing and having a plurality of cylinder block cavities, each of said cavities being bounded by a cylindrical sidewall;
    (d) a plurality of pistons, each of said pistons being slidably mounted within a corresponding one of said cavities, at least some of said pistons being drivingly linked to the drive member, each of said pistons having an end surface and an outer cylindrical surface seating against the corresponding cavity's cylindrical sidewall forming a seal, thereby forming a plurality of sealed chambers, each chamber being defined by one of the cylindrical sidewalls and one of the piston end surfaces;
    (e) a supply conduit connected to the cylinder block, said supply conduit having a fluid passageway in fluid communication with a reservoir of said fluent material;
    (f) an inlet formed in the cylinder block at the supply conduit for permitting fluid flow between the chambers and the passageway of the supply conduit;
    (g) a plurality of nozzles connected to the cylinder block, each of said nozzles having a fluid passageway through the nozzle and each nozzle corresponding to one of the cavities;
    (h) a plurality of cylinder block outlets, each outlet formed between one of the cavities and that cavity's corresponding nozzle for permitting fluid flow between each of the chambers and each of the nozzles' fluid passageways; and
    (i) a turntable rotatably mounted to the housing beneath the nozzles, said turntable being drivingly linked to a rotary prime mover for rotating the substrate beneath the nozzles to receive fluent material on the upper surface of said substrate.

2. The apparatus in accordance with claim 1, wherein each of said pistons has a unique diameter for dispensing a unique quantity of fluent material.

3. The apparatus in accordance with claim 1, further comprising means for releasably linking at least one of the pistons to said drive member.

4. The apparatus in accordance with claim 1, further comprising:
    (a) a solenoid connected to the drive member, said solenoid having a linearly displaceable solenoid drive shaft;
    (b) a locking tab connected to the solenoid drive shaft and slidably mounted to said drive member near at least one of said pistons for being releasably inserted by linear displacement of the solenoid drive shaft into a recess formed in at least one of said pistons, thereby drivingly linking said at least one piston to said drive member.

5. The apparatus in accordance with claim 4, further comprising a second linear prime mover connected to the housing and drivingly linked to the turntable for displacing the turntable relative to the nozzles.

6. The apparatus in accordance with claim 5, further comprising a processor connected to the first and second linear prime movers and the rotary turntable prime mover for actuating the first linear prime mover to displace at least one of the pistons, thereby dispensing sauce on the substrate positioned on the turntable as the turntable is rotated after said turntable has been displaced to an extreme upper position by the second linear prime mover.

7. The apparatus in accordance with claim 6, further comprising at least two manually-actuatable switches connected to said processor for signaling said processor.

8. The apparatus in accordance with claim 6, further comprising at least three stationary platforms mounted to the housing around the turntable for supporting and centering the substrate on the turntable.

9. The apparatus in accordance with claim 8, wherein each of said stationary platforms is terraced to form at least one shoulder on each stationary platform against which a portion of said substrate is adapted to seat during use for centering said substrate on the turntable.

10. The apparatus in accordance with claim 1, further comprising a second linear prime mover connected to the housing and drivingly linked to the turntable for displacing the turntable relative to the nozzles.

11. An apparatus for coating an upper major surface of a pizza crust with pizza sauce, said apparatus comprising:
   (a) a housing;
   (b) a first linear prime mover connected to the housing, said prime mover having a drive shaft displaceable along a longitudinal axis;
   (c) a drive plate drivingly linked to the drive shaft;
   (d) a cylinder block connected to the housing and having a plurality of cavities, each cavity being bounded by a cylindrical sidewall;
   (e) a plurality of pistons, at least some of said pistons being removably linked to the drive plate, and each of said pistons being slidably mounted within a corresponding one of the cavities and having an end surface and an outer cylindrical surface, each of said outer cylindrical surfaces seating against one of the cylindrical sidewalls of the cylinder block, thereby forming a plurality of scaled chambers, each chamber defined by one of the cylindrical sidewalls and one of the piston end surfaces;
   (f) a supply conduit connected to the cylinder block, said supply conduit having a fluid passageway in fluid communication with a reservoir of sauce;
   (g) a plurality of inlets formed in the cylinder block at the supply conduit for permitting fluid flow between the chambs and the passageway of the supply conduit;
   (h) a plurality of inlet valves, each inlet valve mounted near one of said inlets for permitting one-way fluid flow from the supply conduit into the chambers;
   (i) a plurality of cylinder block connected nozzles, each of said nozzles having a fluid passageway through the nozzle and each nozzle corresponding with one of the cavities;
   (j) a plurality of cylinder block outlets, each outlet formed between one of the cavities and that cavity's corresponding nozzle for permitting fluid flow between each of the chambers and the nozzles' fluid passageways;
   (k) a plurality of outlet valves, each outlet valve mounted near one of said outlets for regulating fluid flow from the chambers to the nozzles;
   (l) a turntable rotatably mounted to the housing beneath the nozzles, said turntable being drivingly linked to a rotary motor for rotating the pizza crust beneath the nozzles to receive sauce on the upper surface thereof;
   (m) a second linear prime mover connected to the housing and drivingly linked to the turntable for displacing the turntable vertically relative to the nozzles; and
   (n) a processor connected to the first and second linear prime movers and the rotary turntable motor for actuating the first linear prime mover to displace at least one of the pistons, thereby dispensing sauce on the pizza crust on the turntable as the turntable is rotated after being displaced to an extreme upper position by the second linear prime mover.

12. The apparatus in accordance with claim 11, wherein each of said pistons has a unique diameter for dispensing a unique quantity of sauce.

13. The apparatus in accordance with claim 11, further comprising a means for releasably linking one of the pistons to said drive plate.

14. The apparatus in accordance with claim 11, further comprising:
   (a) a solenoid connected to the drive plate, said solenoid having a linearly displaceable solenoid drive shaft;
   (b) a locking tab connected to the solenoid drive shaft and slidably mounted to said drive plate near at least one of said pistons for being releasably inserted by linear displacement of the solenoid drive shaft into a recess formed in at least one of said pistons, thereby drivingly linking said at least one piston to said drive plate.

15. The apparatus in accordance with claim 14, further comprising at least two manually-actuatable switches connected to said processor for signaling said processor.

16. The apparatus in accordance with claim 11, further comprising at least three stationary platforms mounted to the housing around the turntable for supporting and centering the pizza crust on the turntable.

17. The apparatus in accordance with claim 16, wherein each of said stationary platforms is terraced to form at least one shoulder on each stationary platform against which a portion of said pizza crust is adapted to seat during use for centering said pizza crust on the turntable.

* * * * *